Nov. 17, 1936.  W. H. WEDGER  2,061,296
MANUFACTURE OF SHOES
Filed Jan. 2, 1935

INVENTOR:
Walter H. Wedger
By his Attorney
Harlow M. Davis

Patented Nov. 17, 1936

2,061,296

UNITED STATES PATENT OFFICE 2,061,296

MANUFACTURE OF SHOES

Walter H. Wedger, Belmont, Mass., assignor to Boston Blacking & Chemical Co., Boston, Mass., a corporation of Massachusetts Application January 2, 1935, Serial No. 25

12 Claims. (Cl. 12—142)

This invention relates to shoes and methods of making the same and more particularly to shoes having their outsoles permanently attached to their uppers by means of cement.

It is well known, of course, that in the early days of compo shoes the soles were attached by means of gutta percha cement. The bond produced by such cement, even if initially satisfactory, was not sufficiently durable and was liable to be destroyed by heat and even by that degree of heat to which the shoes might be subjected in normal wear. Though many millions of pairs of shoes were made in this way, the fact that the use of gutta percha and like cements for cement sole attaching has completely gone out of use clearly indicates that such cements are not satisfactory for cement sole attaching under present-day conditions.

Later soles were attached to shoes with pyroxylin cement. Such cements have been and are employed extensively for attaching the soles of compo shoes. This cement, despite its general use, has one quality which is undesirable for cement sole attaching and which seems to be inherent in the nature of the cement; that is, it has been found to stiffen the materials to which it is applied and hence compo shoes having their soles attached by pyroxylin cement have not been so flexible as is generally desired.

Efforts have been made, with some success, to develop rubber latex cements suitable for use in cement sole attaching, but the cements of this type used thus far have never given the strength and durability of bond which is desired for this work.

Rubber cements, that is, solutions of natural rubber in solvents, such as naphtha, have been largely employed for attaching leather to leather but, while they have been reasonably satisfactory for this purpose under some conditions (for example in the laying of soles subsequently to be stitched to the shoe bottoms), they have never been developed to a point where they were satisfactory under the severe conditions which a permanent sole-attaching cement must encounter.

An object of this invention is to produce a shoe having the sole attached solely by cement which will have maximum flexibility and in which the cement bond between the shoe and sole can be relied upon to last as long as the sole.

In one aspect the invention consists in a shoe having its sole attached thereto by a synthetic non-malodorant rubber-like material comprising malodorant-free polymerized chloroprene, such material being obtainable by deodorizing the commercial plastic polymer marketed under the trade-name "DuPrene".

In another aspect the invention comprises a method of making shoes which in a specific embodiment consists in applying a solution of non-malodorant polymerized chloroprene to the attaching surface of the shoe upper, applying a similar coat to the margin of the sole, whereby the polymerized chloroprene is securely anchored to the substance of the shoe upper and sole, allowing the solvents to evaporate, then pressing the shoe and sole together to bring the cemented surfaces into intimate contact. Shoes having their soles attached in this manner are superior in many ways to shoes having their soles attached by other known cements. The use of non-malodorant polymerized chloroprene makes possible the utilization of the adhesive advantages of chloroprene polymers for shoes having adhesively attached soles to be worn, for example, in the home and office, a use otherwise impracticable due to the well-known malodorant character of ordinary polymerized chloroprene. The adhesive advantages of polymerized chloroprene as a sole-attaching medium are many. Thus, the joint is very flexible; that is, the presence of the cement does not noticeably stiffen the parts joined together by it. Polymerized chloroprene has an exceptional and apparently unique affinity for leather and the bond between pieces of leather cemented together with polymerized chloroprene is much superior even to that obtained by the use of pyroxylin cement. The strength of the bond increases for a considerable time after it is formed, due, I believe, to the continued further polymerization or curing of the chloroprene. Tests which have been made indicate that it does not deteriorate with age, the aging qualities of polymerized chloroprene being markedly superior to those of natural rubber. The bond is notably resistant to the action of oils such as may be in the leather or such as may come in contact with it during the wear of the shoe and is as durable as the shoe itself. Moreover, the attachment of soles in this manner can be thoroughly relied upon under any climatic conditions to which shoes are ever subjected, and is not endangered by any temperature which the leather of the shoes would stand without immediate deterioration.

Since the coating of cement on the marginal portion of the sole does not stiffen it, the pressure applied in attaching the sole to the shoe more readily conforms the sole to the shoe bottom where it is held by the strong and instantaneous initial bond produced between the cemented surfaces by the applied pressure. Also, because of the non-stiffening of the sole by the cement and the strong initial bond, tempering and molding of the sole, while desirable, are not always necessary when polymerized chloroprene cement is employed.

In accordance with another aspect of the invention, I have discovered that the polymerized chloroprene cement may be applied to the soles while they are in temper, and still obtain adhesive bonds of high quality, and, in addition, avoid the "spring back" or resilient effect of dry soles, and produce close adherence of the cemented edges of the soles to the shoe uppers.

These and other novel features and aspects of the invention will appear more fully from the following detailed description when read in connection with the accompanying drawing and will be pointed out in the appended claims.

Figure 1:
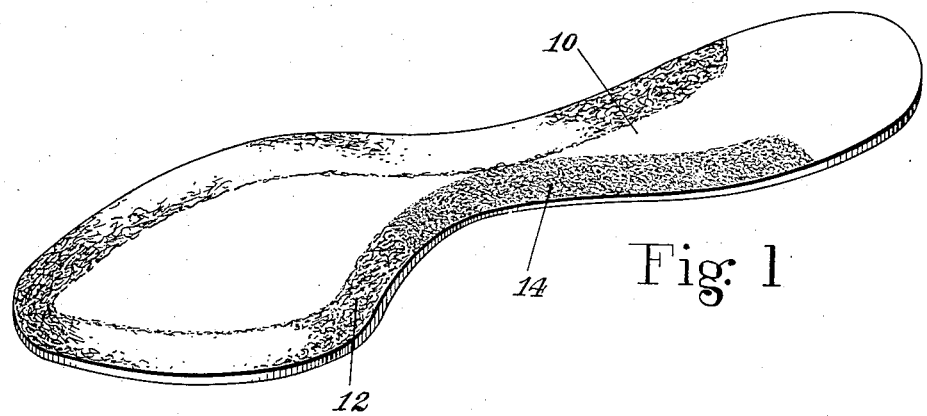
Fig. 1 is a perspective view of an outsole the marginal portion of which has been roughened, as is usual in cement sole attaching, and has had polymerized chloroprene cement applied thereto.
Figure 2:
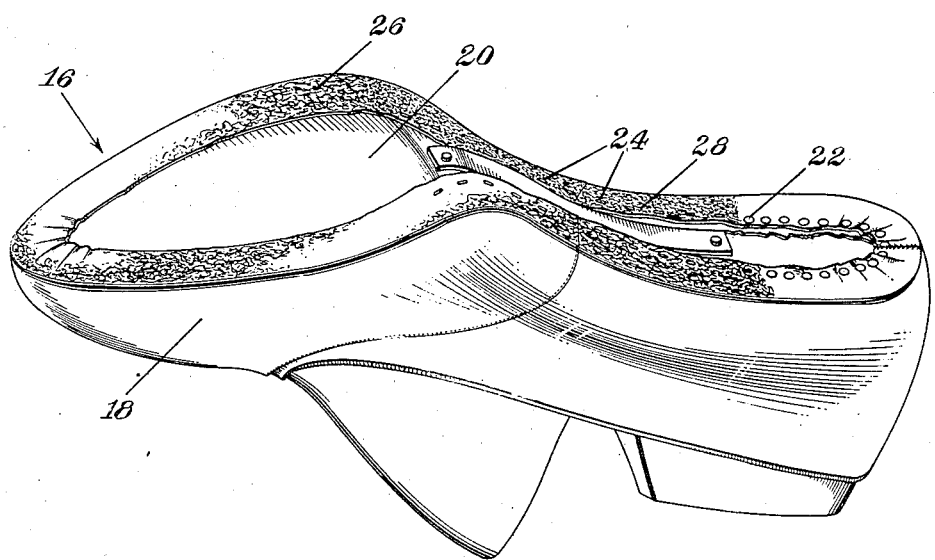
Fig. 2 is a perspective view of a lasted shoe the overlasted portion of the upper of which has been roughened for the reception of cement and has had polymerized chloroprene cement applied thereto.
Figure 3:
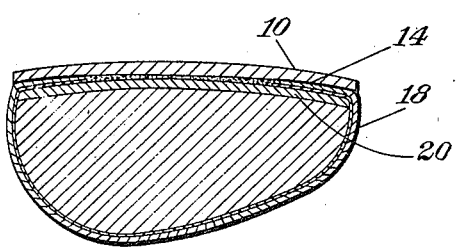
Fig. 3 is a sectional view of the shoe after the sole has been applied and pressed upon the shoe.

Chloroprene (chloro-2-butadiene-1,3) may be made by a process described in Letters Patent of the United States No. 1,950,431, granted March 13, 1934, in the names of Carothers and Collins, and may be polymerized by the process disclosed in Letters Patent of the United States No. 1,950,432, granted March 13, 1934, in the names of Carothers and Collins. The plastic polymers, soluble in organic solvents, are more especially disclosed in Letters Patent of the United States No. 1,950,436, granted March 13, 1934, in the name of Williams, and Letters Patent of the United States No. 1,950,438, granted March 13, 1934, in the names of Carothers, Collins and Kirby. The polymerized chloroprene may be obtained commercially under the name of "DuPrene". This material, however, has a strong odor, objectionable to many persons and which remains even after the solvents used in the manufacture of cement therefrom have evaporated. Accordingly, the chloroprene is preferably, though not necessarily, deodorized by one of the methods described in an application for Letters Patent of the United States Serial No. 755,852, filed December 3, 1934, in the name of Alexander D. Macdonald, and in order to preserve the deodorized or non-malodorant polymer of chloroprene and inhibit its further polymerization or curing, prior to its use as an adhesive, a stabilizer or inhibitor of polymerization, such as about 2% of phenyl-beta-naphthylamine (available under the name "Neozone D") or other stabilizer, may be milled into it, for example in a rubber mill.

In one example of the manufacture of cement from the crude or from the deodorized polymerized chloroprene, from about 2% to about 10%, for example 5%, of a softener, which preferably is wood rosin, is associated with the polymer, though other materials which contain a large proportion of abietic acid or its anhydride, for example pine tar, may be used. This material aids in the milling operation, adds tack to the resulting cement, assists in the reactions brought about by sulphur and metallic oxides used in compounding the cement, and also makes the cement smoother and more easily handled. During the milling operation light magnesium oxide is added, for example 10%. Zinc oxide is also added to help in the subsequent cure, for example 5%. The magnesium oxide prevents scorching during milling with the zinc oxide and also prevents the formation of free hydrochloric acid. After this compound has been milled thoroughly to distribute the various materials, the milled sheets are cut into small pieces and put into a cement mixer or churn. While various solvents may be employed, it has been found that equal parts by volume of benzol and trichlorethylene make a satisfactory solvent, about a gallon of solvent being required for three pounds, more or less, of the milled chloroprene. Other solvents which may be used are carbon tetrachloride, toluol, propylene oxide, ethylene dichloride and chloroform.

About 2% of sulphur, based on the amount of chloroprene, may be put in the mixer with the solvents and the other materials. The materials are then agitated until a smooth, uniform cement is produced.

While an accelerator is not necessary, in accordance with another feature of the invention it is desirable under most conditions to add to the cement a small amount of accelerator at the time of use. For example, a small amount of butyraldehydeaniline is dissolved in benzol and added to the cement before use; about 1%, based on the amount of solids in the cement, has been found satisfactory. Other accelerators, for example about 1% of hexamethylenetetramine, or about ¼% of tetramethylthiuram monosulphide, may be used. The accelerator of such kind and in such quantity promotes further polymerization of the polymer to an elastic or cured condition at a substantial rate, and the resistance of the resulting bond to heat and oils is increased and its aging qualities improved.

Polymerized chloroprene cement thus prepared is very workable, being free from stringiness and having, compared with other cements, an extraordinary affinity for leather. Moreover, the depth to which it penetrates into the leather is controllable by varying the proportions of the different solvents employed. For example, if a larger proportion of benzol in proportion to the trichlorethylene be used, the penetrative power of the cement is increased and, vice versa, if more trichlorethylene is used in proportion to the benzol the cement will penetrate less and hence more of it remain upon the surface. By properly balancing the proportions of these solvents a cement may be produced which will penetrate the leather sufficiently to obtain a secure anchorage to the substance thereof (for example to a distance of a tenth or a few tenths of a millimeter) and yet a sufficient amount will remain on the surface to form an adequate bond with another piece of leather similarly treated. A still greater effect in this direction may be obtained by substituting carbon tetrachloride for all or part of the trichlorethylene.

In use, an outsole 10 is prepared as shown in Fig. 1, the marginal portion of its inner face being roughened at 12 for the reception of cement, which is shown as having been applied to the portion 14 of the margin. The roughening may be done in any of the usual roughening machines employed in the manufacture of compo shoes.

The cement may be applied by hand but preferably it is put on by a cement-applying machine of the extrusion type such as that disclosed in Letters Patent of the United States No. 2,042,479, granted June 2, 1936, in the name of Carl A. Newhall.

A shoe 16 to which the sole 10 is to be applied may have its upper 18 lasted over its insole 20 in any usual manner. For example, as shown herein, the heel-seat portion may be lasted with tacks 22. At the shank portion the upper may be worked over the last and secured in lasted position with curved staples 24, for example by the use of a staple lasting machine such as that disclosed in Letters Patent of the United States No. 1,815,295, granted July 21, 1931, in the name of George Goddu. The forepart may be similarly lasted or the upper may, as shown, be held in lasted position by cement alone. The overlasted margin 26 of the upper is roughened as usual and the polymerized chloroprene cement applied thereto as indicated at 28. The cement may be applied to the shoe by hand or by means of a cement-applying machine, for example one of the extrusion type such as that disclosed in an application for Letters Patent of the United States Serial No. 754,648, filed November 24, 1934, in the name of Wilbur L. MacKenzie. After the peripheral portions of the outsole and shoe have been coated with the polymerized chloroprene cement, they are allowed to dry for a suitable time. By way of example, in the case of the preferred cement composition given above, the work is in suitable condition to be put together after a time of drying of an hour or so and continues in that condition for six hours or more, and as a result of such drying the major portion or greater part of the solvent is removed. The time of drying, and the period within which the cement-coated parts are brought together, will of course vary depending in part upon the volatility and other characteristics of the solvent material employed. After a suitable time, as just indicated, has elapsed, and before the cement has become cured, the outsole and shoe bottom are brought into juxtaposition and under attaching pressure, and this may be accomplished by locating the sole upon the shoe bottom and placing the shoe in a cement sole attaching machine or a sole laying machine having a suitable yielding pad adapted to conform the sole to the shoe and last while under pressure. As a result of the application of such sole-attaching pressure, the layers of polymerized chloroprene cement on the outsole and shoe bottom respectively become coalesced and hold said outsole and shoe bottom adhesively together. So far as the strength of the initial bond between the shoe and sole is concerned, it is immaterial whether the pressure is released immediately or is maintained for a considerable time. However, to insure better and more permanent shaping of the sole to the shoe and to obviate the necessity of previously molding or conforming the sole to fit the curvature of the last bottom, it is preferable under most conditions to maintain the pressure for a substantial time, for example a minute, or, in some cases, even longer.

In accordance with one of the features of the invention, the outsole may be in temper, at the time of the application of polymerized chloroprene cement thereto. I have discovered that, contrary to what would normally be expected, polymerized chloroprene cement will adhere strongly to leather which is in temper. By applying the sole-attaching pressure while the leather outsole is still in temper, the "spring back" or resilient effect of dry soles may be avoided, and, moreover, close adherence of the cemented edges of the soles to the shoe uppers may be obtained, and this may be accomplished by maintaining the shoe upper and outsole under sole-attaching pressure for only a very short time, namely, a matter of a few seconds.

The strength of the initial bond is so great that there is no danger of injuring it by removing the last immediately after the pressure is relieved. Its initial strength is greater than the strength of a pyroxylin bond after several hours. Moreover, the strength of the polymerized chloroprene bond increases rapidly, especially when an accelerator is used. Before the shoes are a day old the strength of a polymerized chloroprene bond is equal to a pyroxylin bond which has attained its maximum strength, and after three or four days, which is long before the shoes will have reached the wearer, the bond has reached substantially its maximum strength, which is ordinarily fifty per cent or more greater than that of a pyroxylin bond. Moreover, the aging qualities of the polymerized chloroprene composition bond are vastly superior to any bond heretofore obtainable by rubber, the polymerized chloroprene bond being substantially unaffected by light, the oxygen of the air or by oils such as those usually present in the other shoe materials. In fact, as the polymerization or curing of the chloroprene advances, either naturally or due to the presence of the accelerator, the polymer approaches an elastic and cured condition analogous to that obtained in the vulcanization of natural rubber under heat and pressure. Moreover, the quality of the adhesive bond obtained by the use of polymerized chloroprene is vastly superior to that obtained by the use of rubber in leather work. Furthermore, it is evident that the other qualities and characteristics of the polymerized chloroprene composition, which make it peculiarly satisfactory for cementing leather soles to shoe bottoms, are not suggested by and could not be predicted from experience with natural rubber, which is its closest known analogue.

Having thus described my invention, what I claim as new and desire to secure by Letters Patent of the United States is:

1. The method of attaching a leather outsole to a shoe upper which comprises disposing plastic polymerized chloroprene between the cooperating surfaces of the outsole and shoe bottom while said outsole is in temper, and, while said outsole is still in temper and before said plastic polymerized chloroprene has become cured, bringing the outsole and shoe bottom into juxtaposition and under attaching pressure.

2. The method of attaching a leather outsole to a shoe upper which comprises anchoring plastic polymerized chloroprene to the attaching surface of a shoe bottom, anchoring plastic polymerized chloroprene to the attaching surface of an outsole while the leather of said outsole is in temper, and, before the plastic polymerized chloroprene has become cured, bringing the outsole and shoe bottom into juxtaposition and under attaching pressure.

3. The method of attaching a leather outsole to a shoe upper which comprises applying a solution of plastic polymerized chloroprene to the attaching surface of a shoe bottom, applying a solution of plastic polymerized chloroprene to the attaching surface of an outsole while the leather of said outsole is in temper, removing the greater part of the solvent portion of the applied solutions and, before the plastic polymerized chloroprene has become cured, bringing the outsole and shoe bottom into juxtaposition and under attaching pressure.

4. The method of attaching an outsole to a shoe upper which comprises providing a solution of plastic polymerized chloroprene containing an inhibitor of further polymerization of said plastic polymer, incorporating in said solution an accelerator of polymerization of such character and in such quantity as to promote polymerization of said polymer to an elastic or cured condition at a substantial rate, and shortly after the incorporation of such accelerator, applying said solution to the cooperating surfaces of the outsole and shoe bottom, and, before said plastic polymerized chloroprene has become cured, bringing said outsole and shoe bottom into jutaposition and under attaching pressure.

5. The method of attaching a leather outsole to a shoe upper which comprises applying malodorant-free plastic polymerized chloroprene to the cooperating surfaces of the outsole and shoe bottom, and anchoring said polymerized chloroprene securely to the substance of said outsole and shoe bottom, respectively, and, before the polymerized chloroprene has become cured, bringing the outsole and shoe bottom into juxtaposition and under attaching pressure.

6. The method of attaching a leather outsole to a shoe upper which comprises applying a solution of malodorant-free plastic polymerized chloroprene to the attaching surface of the shoe bottom, applying a solution of the malodorant-free plastic polymer to the attaching surface of the outsole while the leather of said outsole is in temper, removing the greater part of the solvent portion of said applied solutions, and, while said outsole is still in temper and before said plastic polymerized chloroprene has become cured, bringing the outsole and shoe bottom into juxtaposition and under attaching pressure.

7. A shoe comprising an upper having a shoe bottom, an outsole, and non-malodorant polymerized chloroprene layers disposed between said outsole and shoe bottom and securely anchored to the substance of said outsole and shoe bottom, respectively, said layers being coalesced and holding said outsole and shoe bottom adhesively secured together.

8. The method of attaching a leather outsole to a shoe upper which comprises applying a solution of polymerized chloroprene to the attaching surface of a leather outsole while said outsole is in temper, applying similar adhesive to the attaching surface of a shoe upper, allowing the major portion of the solvent to evaporate, and pressing said outsole and shoe upper together with the cemented surfaces in juxtaposition.

9. The method of attaching an outsole to a shoe upper which comprises applying a solution of non-malodorant polymerized chloroprene to the attaching surface of an outsole, applying similar adhesive to the attaching surface of a shoe upper, allowing the major portion of the solvent to evaporate, and pressing said outsole and shoe upper together with the cemented surfaces in juxtaposition.

10. The method of attaching an outsole to an overlasted leather shoe upper which comprises roughening overlasted portions of the shoe upper, applying a solution of non-malodorant polymerized chloroprene to the attaching surface of the outsole, applying similar adhesive to the roughened overlasted portions of the shoe upper, allowing the major portion of the solvent to evaporate, and pressing said outsole and shoe upper together with the cemented surfaces in juxtaposition.

11. The method of attaching a leather outsole to an overlasted leather shoe upper which comprises roughening overlasted portions of the shoe upper and corresponding marginal portions of the outsole, applying a solution of non-malodorant polymerized chloroprene to the roughened attaching surface of the outsole, applying similar adhesive to the roughened overlasted portions of the shoe upper, allowing the major portion of the solvent to evaporate, and pressing said outsole and shoe upper together with the cemented surfaces in juxtaposition.

12. A shoe comprising an upper having a sole-attaching surface, an outsole, and non-malodorant polymerized chloroprene disposed between said outsole and said sole-attaching surface of said shoe upper and securely anchored to the substance of the sole and upper, and adhesively securing the same together.

WALTER H. WEDGER.